3,017,208
BRACE LOCK FOR MODULAR SCAFFOLDING
Wilbur M. Wyse, Archbold, Ohio, assignor to Bil-Jax, Inc., Archbold, Ohio, a corporation of Ohio
Filed May 29, 1959, Ser. No. 816,879
1 Claim. (Cl. 287—53.5)

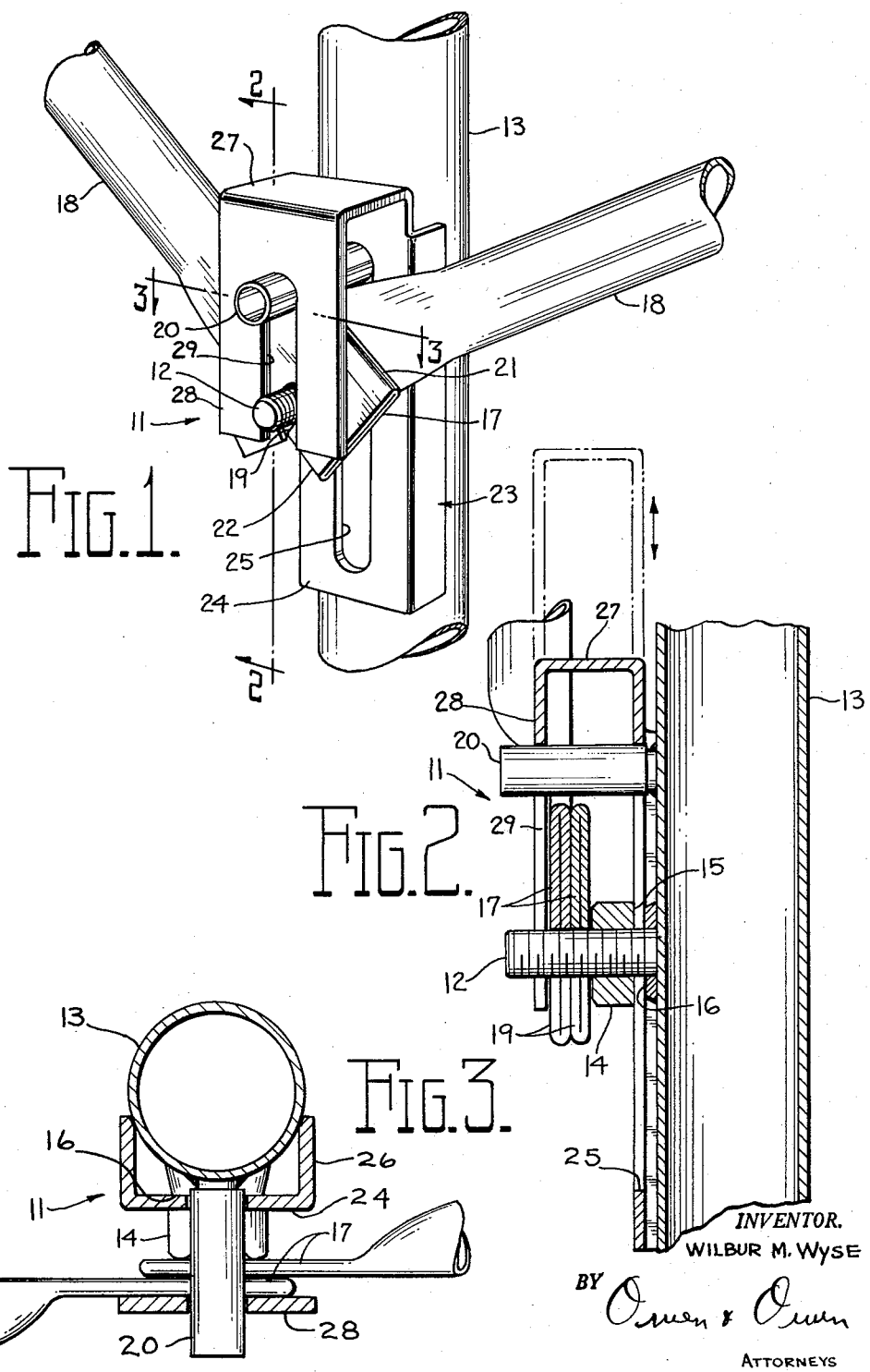

This invention relates to an improved brace lock for modular scaffolding, which lock assures secure connection of a cross brace to an upright of the scaffold.

A brace lock according to the invention includes a threaded shank affixed to an upright, which shank receives slotted, flattened ends of cross braces, and a post affixed to the upright above the shank, which post prevents the flattened ends from moving upwardly off the shank. A lock member slides down over the shank to prevent outward movement of the braces off the end of the shank. The post and the lock member thus prevent the possibility of the brace becoming disengaged from the shank as may occur with some of the brace locks known in the prior art. Even with the secure locking arrangement, however, the flattened ends of the braces can be removed very easily from the shank simply by sliding the lock member upwardly and moving the brace ends off the end of the shank.

It is, therefore, a principal object of the invention to provide a brace lock which gives maximum security yet enables a brace to be disengaged easily from a shank of an upright.

Other objects of the invention will be suggested from the following detailed description of a preferred embodiment thereof, reference being made to the accompanying drawing, in which—

FIG. 1 is a fragmentary view in perspective of an upright and two cross braces secured with respect to the upright by means of a brace lock according to the invention;

FIG. 2 is a view in vertical cross section taken along the line 2—2 of FIG. 1 and showing in dotted lines the highest position of a locking member constituting part of the brace lock; and FIG. 3 is a view in horizontal cross section taken along the line 3—3 of FIG. 1.

A brace lock according to the invention is indicated generally at 11, and includes a threaded shank 12 (see FIGS. 1 and 2) which is welded or otherwise affixed to a vertical upright 13. A nut 14 is screwed onto the shank 12 leaving a guide gap 15 between it and an annular flat portion or land 16 around the shank 12, the purpose of which gap will subsequently appear. The shank 12 is sufficiently long to accommodate two flattened ends 17 of cross braces 18 on that portion extending beyond the nut 14, as best seen in FIG. 3. Slots 19 are formed laterally in the flattened ends 17 to receive the shank 12, as shown in FIGS. 1 and 2. Above and in vertical alignment with the shank 12 is a post 20 which is parallel to the shank 12 and is welded or otherwise suitably affixed to the upright 13. The minimum spacing between the shank 12 and the post 20 must be less than the width of each of the flattened ends 17, to prevent the ends from upward movement off the shank 12, but substantially more than the minimum distance between the end of the slot 19 and a side edge 21 of each of the ends 17 opposite a slotted edge 22, to enable the braces 18 to be positioned at acute angles with respect to the uprights 13.

A locking member indicated generally at 23 is used to prevent accidental movement of the braces 18 off the end of the shank 12. The member 23 comprises a first vertical wall 24 having a vertically extending slot 25 coacting with the guide gap 15 to direct vertical movement of the member 23. The threaded shank 12 and the post 20 extend through the slot 25, with the upright 13 on one side of the wall 24 and the nut 14 on the other side of the wall 24. Side flanges 26 extend partially around the upright 13 to aid in guiding the vertical movement of the member 23. A horizontal connecting wall 27 is integral with the upper end of the first vertical wall 24 and with an upper end of a second vertical wall 28 parallel to the first one. An open ended slot 29 is provided in the second vertical wall 28 longitudinally thereof, the length of which slot is greater than the maximum distance between the shank 12 and the post 20 so that the shank 12 extends through the slot 29 when the post 20 is adjacent the upper end thereof. The horizontal connecting wall 27 is shorter than the shank 12 and the post 20 so that they can extend through the open ended slot 29 a substantial distance past the second vertical wall 28. This prevents the possibility of the flattened ends 17 slipping between the second vertical wall 28 and the outer end of the shank 12, particularly if the second vertical wall 28 should be bent outwardly for any reason. The length of the first slot 25 is sufficient to enable the lower end of the second vertical wall 28 to extend downwardly below the lower portion of the periphery below the shank 12 when the member 23 is in its lowest position, and to enable the lower end of the second vertical wall 28 to be at least level with the post 20, as indicated by the dotted lines in FIG. 2, when the member 23 is in its highest position.

The post 20 prevents any possible accidental movement vertically upwardly of the braces 18 and the second vertical wall 28 prevents movement of the braces 18 off the end of the shank 12. In addition, the member 23 cannot be urged upwardly by the braces 18 because the post 20 interferes with such movement of the brace. Nevertheless, the braces 18 can be removed easily from the shank 12 simply by sliding the locking member 23 upwardly.

Modifications of the above described embodiment of the invention will be apparent to one skilled in the art and it is to be understood that such modifications can be made without departing from the scope of the invention as defined by the appended claim.

What I claim is:

A brace lock for securing a cross brace to an upright of a modular scaffold, said brace lock comprising a threaded shank affixed to the upright and projecting perpendicularly outwardly therefrom; a nut on said shank, said shank being sufficiently long to receive slotted, flattened ends of two cross braces on that portion of said shank extending beyond the nut, the slots in said flattened ends extending laterally to the longitudinal extent of the braces and inwardly from side edges thereof; a post affixed to the upright and projecting perpendicularly outwardly therefrom, parallel to, and in vertical alignment with, said threaded shank, said post being affixed to said upright at a distance above said shank not more than the widths of said slotted, flattened ends of said cross braces and not less than the minimum distances between the ends of the slots in said flattened ends and side edges of the flattened ends opposite slotted edges thereof; a lock member having a first vertical wall with a vertically extending slot through which said post and said threaded shank extend, said upright being adjacent one side of said first vertical wall and said nut being adjacent the other side of said vertical wall, a horizontal connecting wall at the upper end of said vertical wall extending outwardly away from said upright, a second vertical wall parallel to said first vertical wall and connected thereto by said connecting wall, said second vertical wall extending downwardly from said connecting wall, the length of said second vertical wall being greater than the maximum distance between said post and said threaded shank, said second vertical wall having an open-ended slot therein extending vertically upwardly from the lower end of said second vertical wall and being longer than the maximum distance between said post and said threaded shank, said connecting wall being shorter than said post and said threaded shank so that said post and said threaded shank extend through said open-ended slot past said second vertical wall, said first slot in said first vertical wall being sufficiently long to enable the lower end of said second vertical wall to be moved from a position below the lowest portion of said threaded shank to a position above the lowest portion of said post, whereby said post prevents upward movement of the flattened ends off said threaded shank, and said second vertical wall prevents movement of the flattened ends off the end of said shank when said second vertical wall is in its lowest position, but does not interfere with movement of the flattened ends off the end of said threaded shank when said second vertical wall is in its highest position.

References Cited in the file of this patent

UNITED STATES PATENTS

| | | |
|---|---|---|
| 2,686,086 | French | Aug. 10, 1954 |
| 2,716,576 | Nordone | Aug. 30, 1955 |
| 2,726,902 | Borgman et al. | Dec. 13, 1955 |
| 2,841,452 | Borgman et al. | July 1, 1958 |
| 2,935,346 | Marr | May 3, 1960 |